May 22, 1962    L. P. DUNCAN ET AL    3,035,543
MEANS FOR MILKING FARM ANIMALS
Filed Sept. 16, 1960    2 Sheets-Sheet 2
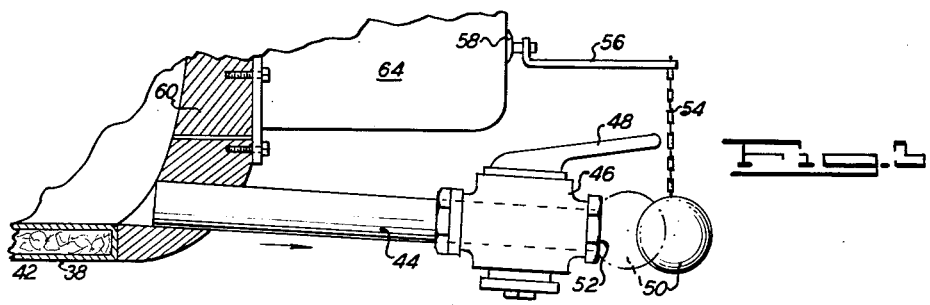
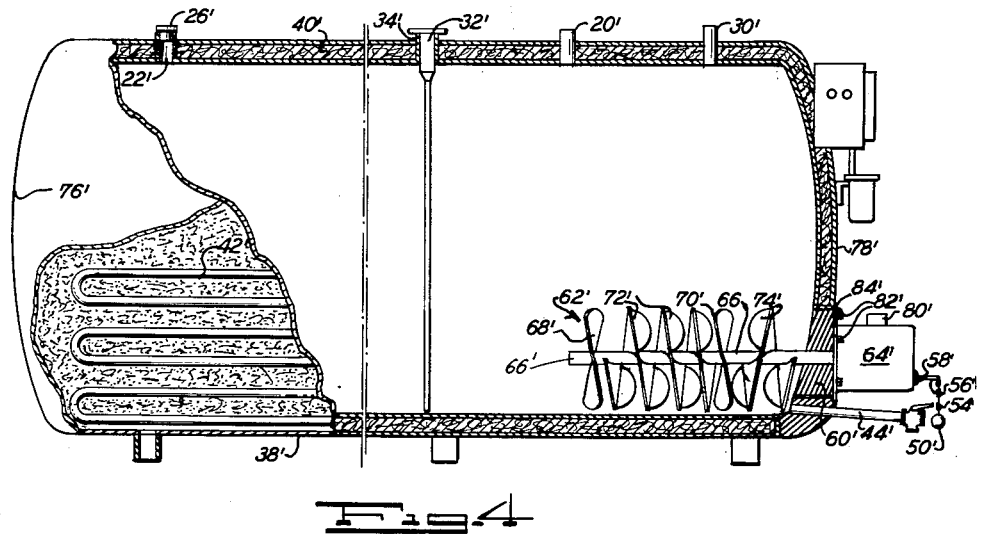
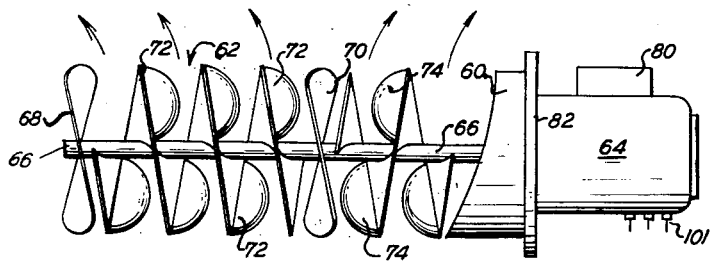
INVENTORS
LLOYD P. DUNCAN
LEON DUNCAN
BY
Mason, Mason & Albright
ATTORNEYS.

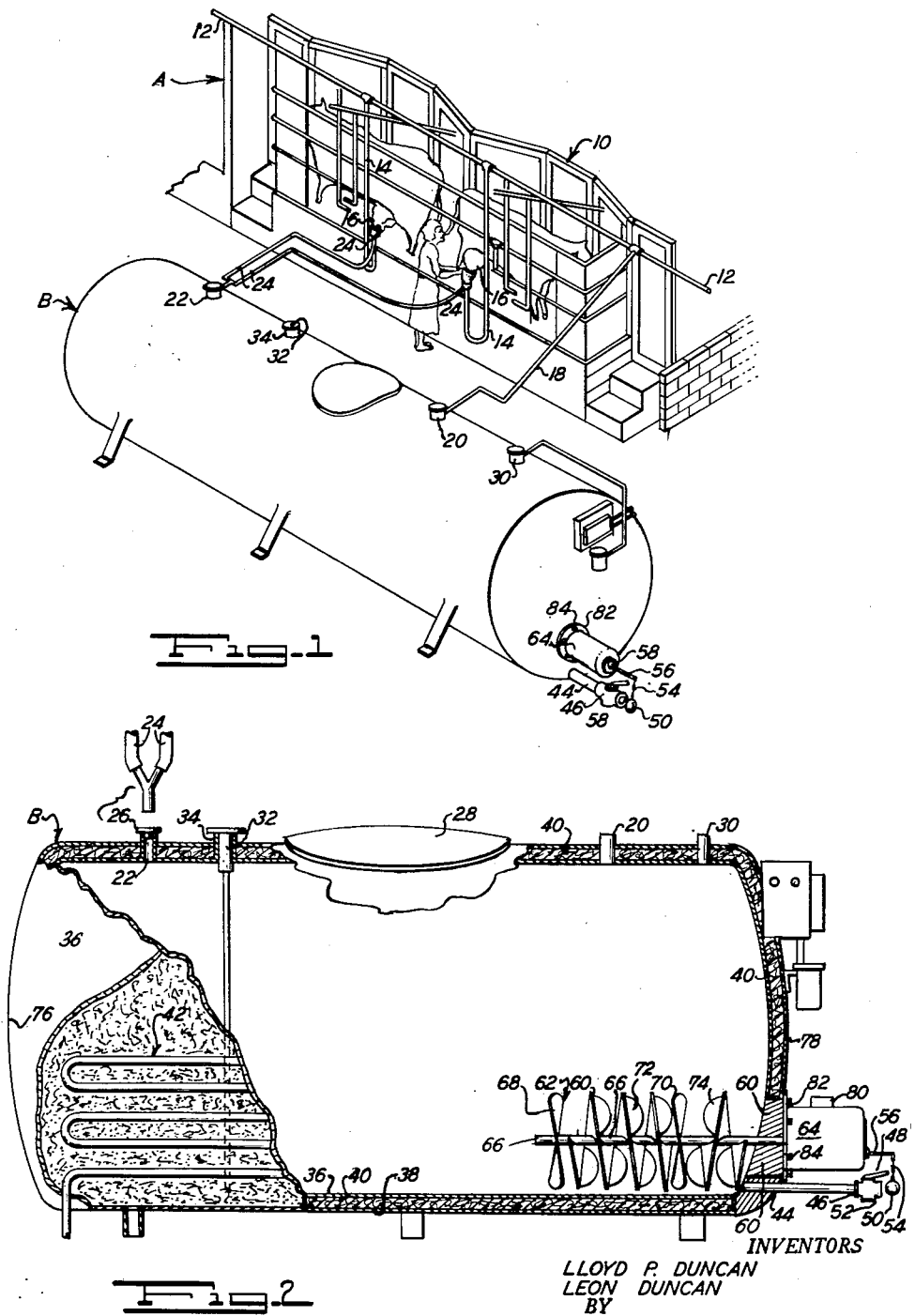

United States Patent Office 3,035,543
Patented May 22, 1962

3,035,543
MEANS FOR MILKING FARM ANIMALS
Lloyd P. Duncan and Leon L. Duncan, Washington, Mo., assignors to Zero Manufacturing Company, Washington, Mo., a corporation of Missouri
Filed Sept. 16, 1960, Ser. No. 56,372
18 Claims. (Cl. 119—14.09)

The present invention relates to an improved apparatus for milking farm animals, the milk being transferred by vacuum from the teat cups to a bulk milk tank where it may be continuously and gently agitated and kept in motion to insure maximum heat transfer between the milk in the tank and the chilled inner tank walls. The invention is also concerned, following the release of the milk in the tank, with the cleaning of the inner walls of the tank. The cleaning operation includes the same agitating means operated at a higher rate of speed whereby to direct cleaning fluids to all portions of the inner tank walls. The present invention is an improvement in the structure set forth in the George R. Duncan et al. Patent No. 2,873,723, granted February 17, 1959.

One of the principal objects of the invention, therefore, is the provision of a novel agitator and washer, particularly for bulk milk tanks holding up to 2,000 gallons or more of milk, wherein the size of the tank raises new problems of sanitation and maintenance.

Another object relates to a system for milking cows wherein the sequence of operation involves the steps of continuously milking a plurality of cows in succession or even the simultaneous milking of several cows. The milk enters the tank by a conduit as it comes from the cows. In the tank the milk is subjected to minus pressure. The system further contemplates drawing the milk into the tank by vacuum where it is chilled. To drain the tank, the tank vacuum is released and the milk is automatically drained into a tank truck. This is followed by introducing a washing solution into the milk tank, after which the tank interior walls are subjected to thorough cleaning action by high speed agitation and the "throwing" of the washing solution onto all of the inside surfaces of said walls including the "corners" formed at the junction of the cylindrical wall of the tank with the tank ends. The tank is then drained of washing solution and the entire operation is repeated.

An additional object is to increase the efficiency of the combined milk stirrer and cleaning solution impeller by providing an improved type of impeller, and motor drive means therefor, as well as to provide a readily accessible and easily removed mounting means therefor.

A further object is to provide a milk treating system having a bulk milk tank provided with improved draining facilities.

Another object is to provide a combined impeller and motor assembly therefor which may be readily removed and replaced as a unit on the tank, the same being accessibly located, especially when used on large bulk milk tanks having capacities of up to and over 2,000 gallons of milk capacity.

An additional object is to provide a type of motor especially adapted for circulating the milk within a bulk milk tank whereby to cause a good heat exchange between the cooled walls of the tank and the milk by agitation of the milk at very low speed. Low speed circulation of the milk within the tank obviates forming buttermilk, which would occur if the milk were circulated at a very high rate of speed. However, the motor may be operated at a very high rate of speed, such as 900 r.p.m. or over for forceful circulation of cleaning fluids within all portions of the tank interior.

Other objects will appear hereinafter throughout the specification.

In the drawings:
FIGURE 1 is a perspective view of a portion of the milking parlor with pipe connections to the bulk milk tank.
FIGURE 2 is an enlarged side elevational view of the tank with parts broken away and parts in section.
FIGURE 3 is an enlarged view of the lower right-hand portion of FIGURE 2.
FIGURE 4 is a view similar to that of FIGURE 2 of a modified construction; and
FIGURE 5 is an enlarged side elevational view of the agitator and motor construction.

Referring now to the drawings, A indicates a milking parlor and B the bulk milk tank. The milking parlor has a stall construction 10 for a plurality of animals, two being illustrated. Extending longitudinally of the milking parlor is a vacuum line 12 from a milking means, not shown but of conventional type, said line having branch lines 14 leading to the sets of teat cups 16. There is at least one vacuum branch line 18 leading to the vacuum nipple 20.

There is also a milk nipple 22 to which is connected one or both of the lines 24 leading from the teat cups 16. The line or lines 24 should be disconnected from the nipple 22 and the plug 26, which may consist of rubber or other pliable material, inserted when that portion of the cycle is reached.

The tank is also provided with a vacuum lid 28, a wash water nipple 30, and an aperture 34 for the reception of the measuring stick 32. It will be understood that the measuring stick when used in the position shown in FIGURE 2 is provided with a seal, not shown, whereby to obviate leakage around the mounting of the measuring stick and the aperture in the tank in which the measuring stick has been inserted.

Referring now to the tank itself, this tank is similar to other milk tanks wherein the tank consists of inner and outer walls 36 and 38, respectively, with insulating material 40 between the walls. It will further be understood that a refrigerating medium is circulated in such manner as to lower the temperature of the inner wall 36. The provision of this means may take various forms, one form being the location of a heat-exchange seppentine pipe 42 which is welded to the outer lower portion of the tank, as seen in FIGURE 2. It will also be noted that the ends of the tank are preferably of a generally curved shape forming a section of a sphere at the ends of the tank, indicated by the reference numerals 76 and 78. This construction provides maximum strength with minimum materials.

When a vacuum is applied to the vacuum nipple 20 via the pipe 18, the milk may be drawn directly from the cow or cows through the pipes 14 from the teat cups 16, due to the vacuum within the tank B. When a minus pressure has been applied to the interior of the tank, this action automatically closes the drain valve shown in detail in FIGURE 3. This valve is connected to drain pipe 44 which communicates with the interior of the tank and its other end is connected to the manually operable valve 46.

Assuming the valve handle 48 has been turned to the position where the pipe 44 communicates with the outside air, the application of a minus pressure to the inner tank 36 results in drawing the ball valve 50 toward its seat 52. When it engages this seat, it prevents the entrance of air through the pipe 44 to the interior of the tank. The ball valve is supported on a chain 54, the latter being supported on an arm 56 which is mounted on a vacuum cup 58 that may be attached to the side wall of the tank. Preferably, however, the suction cup is attached directly to an outside portion of the motor 64. The filler block 60 serves to mount the agitating means 62 and the electric motor 64.

The agitating means 62, as shown in FIGURE 5, is of special construction and is adapted to circulate the milk at a slow speed within the tank so that various portions of the milk will come into contact with the chilled interior wall 36 of the tank. This construction is particularly adapted, during the washing operation, for forcing the cleaning fluids simultaneously in a plurality of directions whereby to wash all the interior portions of the tank. The washing fluid is impelled by this agitator with considerable force against all interior walls 36 of the tank when the agitator is operated at high speed.

FIGURE 5 shows a shaft 66' upon one end of which is mounted agitating means 62 and upon the other end of which is mounted the electric motor 64. Preferably, mounted on the end of the shaft 66 is a paddle 68. There is a second paddle 70 located substantially midway of the shaft 66, and between the paddles 68 and 70 are a plurality of cup-like agitator blades 72 which face to the left, while between the second paddle 70 and the filler block are one or more cup-like paddle members or buckets 74 which face to the right, as viewed in FIGURE 5.

The result of the operation of these paddles, buckets, or agitator blades is as follows. Paddle 68 moves the liquid lengthwise in the general longitudinal direction of the tank and in a leftward direction along the bottom of the tank. Intermediate paddles or agitator blades 72 cause the washing fluid to be elevated generally upward and to the left so as to engage the inner top surface of the tank and also the left end. Paddle 70 causes the washing fluid to move generally upward so as to engage the under side of the tank, the washing fluid being forced in a substantially vertical direction, and paddles 74 force the liquids in the reverse direction from blades 72, or generally to the right as viewed in FIGURE 5, so as to engage the right wall 78 of the tank, the left end being indicated by reference numeral 76.

Referring to the motor 64, which consists preferably of a direct current motor, this motor is provided with a rheostat generally indicated by reference numeral 80 whereby to regulate the speed of the motor 64. Due to the fact that this is a direct current motor, its speed may be regulated so as to maintain a speed of about 20 r.p.m. for gently circulating the milk within the tank. However, when the cleaning solution is admitted to the tank, the motor may be operated at a speed up to 900 r.p.m. or higher so as to cause the liquids to engage with great force all the interior surfaces of the inner tank 36 whereby to dissolve all the detritus accumulations within. The location of the motor-paddle-impeller construction makes it possible to agitate at very low depths of milk in the tank, whereby the milk may be cooled even though a small quantity is located within the tank. Of course this construction will work equally well for large quantities of milk. Additionally, this impeller, due to its location and construction, may be operated with a minimum of water, but nevertheless will cause all surfaces to be thoroughly cleaned. The location of the impeller adjacent the base of the tank makes it possible to remove the motor-impeller-paddle construction with a minimum of effort for cleaning, repair, or replacement. In other constructions where the impeller is mounted in the top of the tank, the impeller will not operate efficiently unless there is a large amount of milk to be stirred or a large amount of washing solution. Moreover, in very large tanks it is necessary to provide a ladder on the side of the tank in order to reach the top thereof for the purpose of cleaning, repair, or removal of the agitator mechanism.

The agitator-motor assembly, including the filler block 60, is mounted on a plate 82 which is held by suitable fastening means such as a ring of bolts 84 to the side of the tank. There is a gasket, not shown, between the plate 82 and the end wall 78 upon which it is mounted.

The stirring device acts as a slowly moving auger at low speed, a paddle agitator at intermediate speeds, and an impeller when high speeds are used. It will be noted that the structure shown eliminates the use of a gear reduction for the electric motor. It is preferred that the horizontally located tank, as shown, be slightly raised at its left end for only a few degrees whereby to cause drainage of the fluids within the tank toward the agitator means 62. An opening at the top of the tank is closed by vacuum lid 28, but this opening may be replaced by a hinge cover on the lower end drain side of the tank (not shown) when using the largest size tanks in which the diameter of the tank is increased.

It will be further understood that the milk is gently agitated at about 20 r.p.m. during the milking operation, in order to properly stir the milk even when a minimum amount of milk is in the tank. This tank, as stated above, will ordinarily be under vacuum, and the gentle agitation of the milk will ensure maximum heat transfer during the milking operation and after the same.

Various means may be provided for converting ordinary house current from A.C. to D.C., and these may include rectifiers (transistors, diodes, etc.) or other well-known means for converting the 60-cycle, 120-volt alternating current to direct current.

The construction shown in FIGURE 2, therefore, would be used for smaller tanks of approximately 800-gallon capacity, while that shown in FIGURE 4 would be used for larger tanks holding up to or over 2000 gallons of milk. The tank illustrated in FIGURE 4 is provided with a milk nipple 22' and a plug 26' therefor, a vacuum nipple 20' and a wash water nipple 30'. The measuring stick 32' is located in the aperture 34'.

The agitating means is indicated at 62' having a motor 64', a shaft 66', paddles 68' and 70'. The construction of the paddle means is the same as that shown in FIGURE 5, and comprises end paddle 68' and intermediate paddle 70' with agitator blades or buckets 72' and paddle members 74'. The left and right ends of the tank are designated by the numerals 76' and 78', respectively. 60' is the filler block, 82' is the plate, and the bolts are 84'. The motor is provided with a rheostat 80'.

It will be noted that the principal purpose of having the variable speed motor, particularly a direct current motor, is that such a motor provides a differential of speeds between minimum and maximum speeds. Such a motor is particularly adaptable for moving the two different kinds of liquid within the tank. For example, with a small amount of milk in the tank bottom, the agitator may be rotated at 20 r.p.m. and up to 50 r.p.m. as a refrigeration milk agitator. Between this point and 150 r.p.m., it may operate as a butterfat test agitator for the milk within the tank. These speeds may vary, of course, within limits, depending upon the temperature at which the milk within the tank is maintained, the amount of milk in the tank, and the quality of the milk. After the milk has been tested at different speeds, and these factors have been determined, the vacuum is broken and the milk automatically is drained from the tank.

Following the use of the tank during a certain period of time, it becomes necessary to clean the interior of the tank. A cleansing solution consisting of soap and water or detergent solutions is used with the previously disclosed apparatus. Only a minimum amount of washing liquid need be used, due to the location of the agitator in the bottom of the tank and the blades which extend almost to the lower inside surfaces of the tank. With the cleansing solution in the tank, the motor is turned to high speed.

This may be readily accomplished by using the rheostat 80 or 80', shown diagrammatically in FIGURES 2, 4 and 5. The motor may be operated at speeds of 300 r.p.m. to about 900 r.p.m. The higher the speed of the motor, the more forceful is the application of the cleansing liquid to all portions of the inner tank. It will be appreciated that the use of the direct current motor enables the apparatus to be used for gentle agitation of milk, for faster rotation in butterfat testing, and for high speed cleansing of the tank interior.

It will be further understood that the tank is of general cylindrical configuration in vertical cross section, but other similar shapes may be used, such as a tank having any elliptical cross section. In the smaller tanks, the milk may be poured into the tank from cans or other receptacles, in which case the milk nipple and vacuum nipple will not be attached during the operation of milking and stirring of the milk.

*Operation*

Assuming the tank has been entirely cleaned and that each of the milk and vacuum conduits have been closed by suitable plugs or by valves, not shown, the operation starts when the cows are milked in the usual manner by means of the vacuum branch line 18 which is connected to the vacuum nipple 20 or 20', it being further assumed that the vacuum line 12 is connected to a suitable milking machine, not shown. The milking operation progresses as fresh cows are placed in the stall construction until all the cows have been milked. During this time, the milk is continuously and gently stirred as it is drawn into the bulk milk cooler tank, in which the agitator operates at very low speed of about 20 r.p.m. Should it be desired to obtain a butterfat test, the speed is slightly increased by the rheostat 80 or 80', shown in FIGURES 2 and 4, respectively. Following this operation, the vacuum is released, by any suitable means such as opening the valve to the atmosphere, not shown, such as the vacuum pipe 18. Other means may be provided to break the vacuum, as will be readily understood by one skilled in the art. After the milk has been drained from the tank, the vacuum is again applied to the tank and a washing solution is introduced through the pipe which connects with the nipple 30, following which the stirrer or agitator 62 is operated at high speeds to cause the washing solution to splatter against the inner walls 36 of the tank, it being understood that a high rate of speed is attained, up to 900 r.p.m. or over, during this washing operation whereby the interior of the tank is entirely cleansed of deposits. The vacuum is then released by any suitable means whereupon the ball valve 50 assumes the full line position shown in FIGURE 3, the washing solution finding its way by gravity out of the tank, it being assumed that the lower end of the tank adjacent the drain pipe 44 or 44' is slightly lower than the left end of the tank as viewed in either FIGURE 2 or FIGURE 4.

The above description and drawings disclose two embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. An apparatus for milking farm animals comprising a bulk cooler tank having milking means and vacuum means interconnected with the interior thereof by suitable pipe lines, said tank having a removable section or filler block adjacent to one end thereof, a power driven shaft extending through said section or block, said shaft having agitator means thereon inside said tank, said last-named means extending longitudinally of said tank and located adjacent the bottom thereof.

2. The structure of claim 1 wherein said filler block is provided with means for removably mounting the same and the agitator means thereon from said tank.

3. The structure of claim 1 wherein a direct current electric motor is mounted on said filler block for driving said power driven shaft means for removably mounting said filler block from the said one end of said tank whereby said agitator means, filler block and motor may be removed as a unit from said tank end.

4. The structure of claim 1 wherein said agitator means comprises a plurality of paddles for moving liquid longitudinally of the tank when said agitator means is moving at low speed.

5. The structure of claim 1 wherein said agitator means is provided with a plurality of cup-like agitator blades for moving liquid upwardly during washing operations when said agitator means is moving at high speed to engage the underside of the tank during cleaning operations.

6. The structure of claim 1 wherein said agitator means is provided with a plurality of paddles, and a plurality of cup-like agitator blades located between at least some of said paddles whereby to move the liquid in said tank in the general longitudinal direction of the tank, and for elevating the liquid upwardly for engaging the inner top surface of the tank.

7. The structure of claim 1 wherein an electric motor is mounted on said filler block.

8. The structure of claim 7 wherein said tank is provided with a drain pipe and check valve means operatively associated with said drain pipe for closing the same when said vacuum means is operatively connected with the interior of said tank.

9. The structure of claim 7 wherein an electric motor is mounted on said filler block and wherein said filler block is provided with means for removably mounting the same and the agitator means thereon from said tank.

10. An apparatus for milking farm animals comprising a bulk cooler tank having milk-receiving means operatively associated therewith and vacuum means interconnected with the interior thereof by suitable pipe lines, said tank having a removable section or filler block adjacent the bottom of one end thereof, a power driven shaft extending through said section or block, said shaft having agitator means thereon inside said tank, said last-named means extending longitudinally of said tank and located adjacent the bottom thereof.

11. The structure of claim 10 wherein said filler block is provided with means for removably mounting the same and the agitator means thereon from said tank.

12. The structure of claim 10 wherein a direct current electric motor is mounted on said filler block for driving said power driven shaft, means for removably mounting said filler block from the said one end of said tank whereby said agitator means, filler block and motor may be removed as a unit from said tank end.

13. The structure of claim 10 wherein said agitator means comprises a plurality of paddles for moving liquid longitudinally of the tank when said agitator means is moving at low speed.

14. The structure of claim 10 wherein said agitator means is provided with a plurality of cup-like agitator blades for moving liquid upwardly during washing operations when said agitator means is moving at high speed to engage the underside of the tank during cleaning operations.

15. The structure of claim 10 wherein said agitator means is provided with a plurality of paddles, and a plurality of cup-like agitator blades located between at least some of said paddles whereby to move the liquid in said tank in the general longitudinal direction of the tank, and for elevating the liquid upwardly for engaging the inner top surface of the tank.

16. The structure of claim 10 wherein an electric motor is mounted on said filler block.

17. The structure of claim 16 wherein said tank is provided with a drain pipe and check valve means operatively associated with said drain pipe for closing the same when said vacuum means is operatively connected with the interior of said tank.

18. The structure of claim 16 wherein an electric motor is mounted on said filler block and wherein said filler block is provided with means for removably mounting the same and the agitator means thereon from said tank.

References Cited in the file of this patent

UNITED STATES PATENTS

| | | |
|---|---|---|
| 1,987,917 | Thwaits | Jan. 15, 1935 |
| 2,287,591 | Adams | June 23, 1942 |
| 2,360,145 | Lansing | Oct. 10, 1944 |
| 2,873,723 | Duncan et al. | Feb. 17, 1959 |